June 23, 1970     G. M. DILLARD     3,517,172

MOVING-WINDOW DETECTOR FOR BINARY INTEGRATION

Filed Dec. 27, 1967     2 Sheets-Sheet 1

INVENTOR.
GEORGE M. DILLARD
BY
ATTORNEYS

INVENTOR.
GEORGE M. DILLARD
BY
ATTORNEYS

United States Patent Office 3,517,172
Patented June 23, 1970

3,517,172
MOVING-WINDOW DETECTOR FOR
BINARY INTEGRATION
George M. Dillard, El Cajon, Calif., assignor to the
United States of America as represented by the Secretary of the Navy
Filed Dec. 27, 1967, Ser. No. 693,981
Int. Cl. G01s 9/02; G06f 3/05; H02v 13/07
U.S. Cl. 235—154                                        10 Claims

ABSTRACT OF THE DISCLOSURE

A system for performing binary integration on quantized data is disclosed such as might be developed at the output of a receiver for a multiple-resolution-element radar. A so-called "moving-window detector" system is described, its operation explained, and expressions for false-alarm and detection probability are developed. A method for determining optimum detection thresholds and optimum quantizing levels is disclosed and the application of the moving-window detector system equipment to a particular multiple-range-element radar is described in a typical embodiment availing of the advantageous features of the invention.

---

The invention described herein may be manufactured and used by or for the Government of the United States of America for governmental purposes without the payment of any royalties thereon or therefor.

Background of the invention

Many methods have been suggested for applying automatic detection techniques to input data such as may be developed by radar receiving equipments. Much of the past effort, however, has been directed toward optimizing detector characteristics such as detection probability, detection range, etc. without special regard to the complexity of the equipment which is required to implement the method. For example, the application of sequential analysis to radar detection often results in improved radar performance but, owing to the random nature of the sample size, complex equipment in the form of an electronically steerable antenna is usually required.

Somewhat simplified systems have been suggested whereby the input data are quantized into two amplitude levels and integrated by counting the number of times the quantizing level is exceeded. It may be shown by mathematical analysis that binary integration is at most 1.9 db poorer because of the quantization loss in the case of the detection of a sine wave in Gaussian noise.

Summary of the invention

The present invention comprises a system for improved detection of signal information contained in input data, which information is developed and discerned relative to time references of a cyclic nature. Equipment embodying the present invention may comprise first and second means for cyclically sampling the input data at incremental first and second time periods, respectively, where the second incremental time periods occur an integral number of times during each of the first time periods. Accordingly, when the present invention is adapted to use in a radar system, the first sampling means may indicate range while the second sampling means may indicate angular resolution within a particular range increment.

A delay means is arranged to receive the output of the second sampling means and includes a path which is arranged to cause the delay means to operate in the manner of a clocked recirculating memory. The total delay of the delay means is substantially equal to the sum of the time period between cyclic time references plus a determinable number of the second incremental time periods and the output of the delay means is cyclically and regularly sampled at the second incremental time periods. Accordingly, the recirculation through the delay means by the particular amount of delay specified and required in accordance with the concept of the present invention, causes the recirculated output to appear at different times relative to the sampling time and the count of the cumulatively sampled outputs effectively provides a means of integrating information detected.

An appropriate comparator is connected to receive the cumulative count so that it may be compared to a determinable reference count signal whereby to confirm the presence of signal information in the original input data.

A primary object of the present invention is to provide an improved system for the detection of signal information in multiple-resolution input data.

Another important object of the present invention is to provide such a system which may be relatively simply implemented as contrasted to prior art systems capable of comparable results.

Yet another object of the present invention is to provide an improved multiple-resolution detection system which does not require multiple counters.

Still another object of the present invention is to provide an improved multiple-resolution detection system which is readily adapted to digital operation.

Yet a further object of the present invention is to provide such an improved multiple-resolution detection system which can readily be embodied in a form for processing multiple bit binary signal information.

Another most important object of the present invention is to provide a multiple-resolution detection system which obviates the need for an electronically steerable antenna when employed with radar systems.

These and other objects, advantages, features, and improvements of the present invention will be more fully appreciated from the description of several preferred embodiments which follows together with the illustrative drawings.

Description of the preferred embodiments

Figure 1:
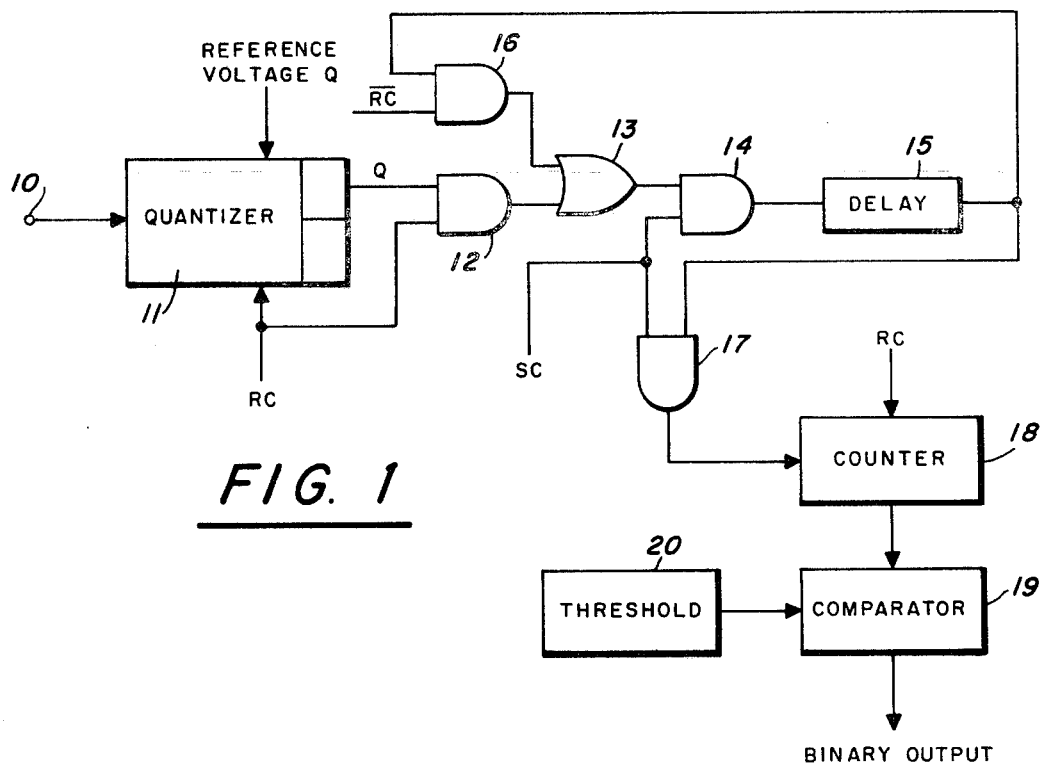
FIG. 1 is a schematic block diagram of the moving-window detector equipment of the present invention.

FIG. 1 is a schematic block diagram illustrating the principal elements and their interconnection in a preferred embodiment of the present invention. An input terminal 10 is adapted to receive the input data which may typically be the output signal generated by a radar receiver, for example. The input terminal 10 is connected to a quantizer 11 which also receives a determinable reference voltage designated as "$q$." The quantizer 11 is also adapted to receive a sampling input which may typically be a range clock signal. The output signal of quantizer 11 is connected to an AND gate 12 together with the range clock signal. The output of the AND gate 12 is connected to an OR gate 13, which in turn has its output connected to an AND gate 14. AND gate 14 also receives a second input signal which may typically be in the form of a sweep clock pulse in a radar system.

The output of the AND gate 14 is connected to a delay means 15 and its delayed output is arranged to be recirculated to an AND gate 16. The AND gate 16 receives a second input signal which is representative of the absence of a range clock signal. The output of the delay means 15 is also connected to an AND gate 17 which receives a second input in the form of a sweep clock pulse.

The output of AND gate 17 is connected to a counter 18 which in turn is connected with a comparator 19. The comparator 19 receives its second input from a source of threshold signal 20. The counter 18 also receives a reset signal which may typically be in the form of range clock pulse in a radar equipment.

For purposes of explanation and illustration, certain related system parameters may be assumed for purposes of discussing the operation of the arrangement of equipment in the form of a moving window detector of the present invention schematically represented in FIG. 1. If it is assumed that the moving window detector of the present invention as illustrated in FIG. 1, is employed with a radar system, the pulse repetition frequency of the transmitted signal may be designated as 126 pulses per second; the antenna scan rate in azimuth may be 15 r.p.m. and the beam width of the antenna may be designated as such that six pulses are transmitted within one beam width. Further, assuming a range resolution of one-half mile, 1300 separate and discrete range elements would be indicated with data obtainable from each element by sampling the receiver interval at approximately 6.1 microsecond intervals.

In such a radar system, a number of system timing signals would be readily available, such as trigger pulses which occur at 126 pulses per second simultaneously with the radar pulse transmissions, range-clock pulses which occur at 126×1300 pulses per second with the receiver output being sampled at the occurrence of each range clock pulse and sweep clock pulses which occur at 6×1300×126 pulses per second.

Figure 2:
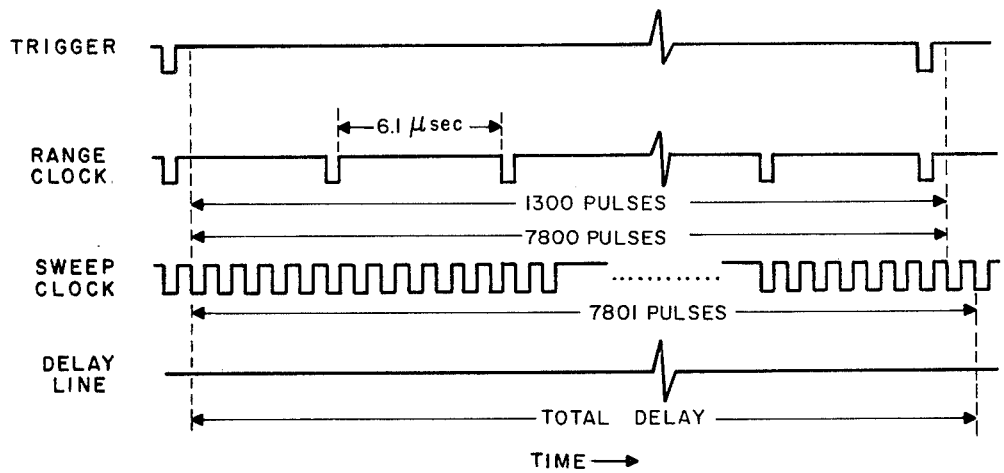
FIG. 2 is an illustration of several waveforms showing the timing relationships between various elements of a radar system in which the present invention may be typically applied.

FIG. 2 illustrates the three cyclically generated signals mentioned above, i.e. the trigger, the range clock pulse, the sweep clock pulse as indicated by the first, second, and third waveforms, respectively. The delay time which is characteristic of the delay means associated with the present equipment is seen to be equal to 7,801 sweep clock pulses, or, in other words, the sum of the time period between the cyclic time reference of the trigger pulses and one of the incremental time periods of the sweep clock source. Logically, the delay line included in the present invention may be considered a multiple shift register which shifts at the sweep clock rate so as to interpose a delay between its input and output signals equal to the sum of the time period between the basic cyclic time reference, such as the trigger clock, and an integral number of time periods of the higher frequency sampling means such as the periods of the sweep clock pulses when employed with a radar system.

In operation, the moving window detector illustrated in FIG. 1 receives input data which may typically take the form of the output signal developed by a radar receiver and impressed upon input terminal 10. The quantizer 11 compares the input data with a reference "$q$" at each range clock pulse. When the input data exceeds the threshold of the reference "$q$," an output is produced which is connected as one of two inputs to an AND gate 12. The second input to the AND gate 12 is the range clock pulse. In accordance with customary quantizing methodology, the quantizer output may be a logical "one" if the input data exceeds the reference "$q$," and is a logical "zero" otherwise. Simultaneously with each trigger pulse the radar transmits a pulse, and data are obtained from the quantizer by each range clock pulse.

The first range clock pulse after the trigger pulse is applied to the AND gate 12 together with the quantizer output. The output of the AND gate 12 is connected to an OR gate 13 and its output, in turn, is connected to an AND gate 14 which receives a second input in the form of the sweep clock pulse. Accordingly, when a sweep clock pulse coincides with a range clock pulse, either a logical "one" or a logical "zero" is caused to be entered into the delay means 15 through the AND gate 14 in accordance with the instantaneous output at that moment of the quantizer 11.

The delay means 15 has one output which is recirculated to an AND gate 16 and the gate 16 is arranged to be enabled by the lack of a range clock pulse. Accordingly, the recirculation of the delayed signal is inhibited for one sweep clock period. Between range clock pulses, the AND gate 12 is disabled while the AND gate 16 is enabled.

Accordingly, recirculation of the delayed signals occurs except at sweep clock pulses which coincide with range clock pulses. Between range clock pulses, the signal data in the delay means 15 are recirculated and shifted by one sweep clock pulse for each such recirculation until achieving a cumulative shift of six sweep clock pulses. This sequence is continued with the single bit of data, i.e. a logical "one" or logical "zero" being stored after each range clock pulse and with data being recirculated otherwise.

At the next trigger pulse, storage of data from the next radar pulse transmission commences. Since 7800 sweep clock pulses occur between trigger pulses, and the delay means 15 has a delay corresponding to 7801 sweep clock pulses, data obtained following the latest trigger pulse will be stored adjacent in point of time to the data obtained from the following previous trigger pulse.

Figure 3:
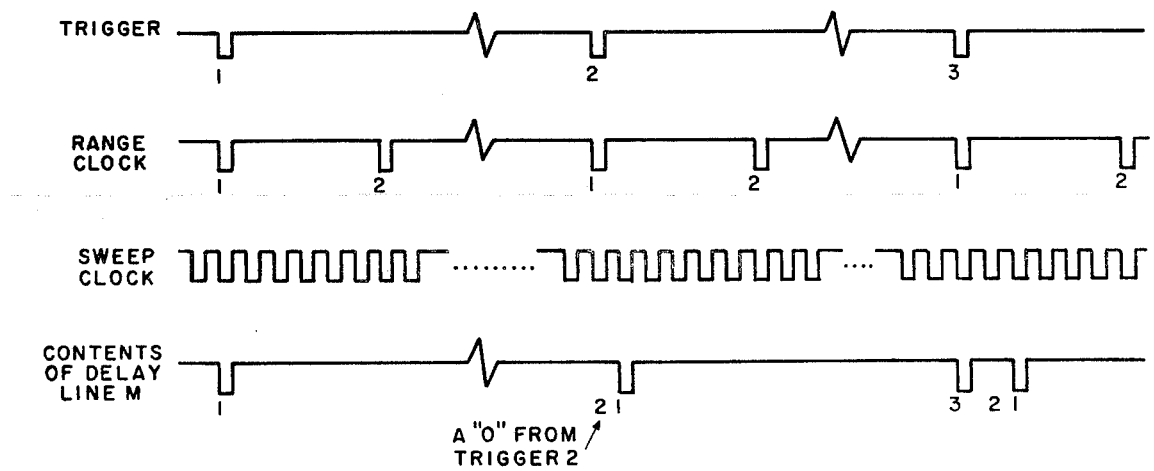
FIG. 3 is an illustration of several waveforms showing the timing relationships between certain elements of a typical radar system and the moving-window detector employed therein.

FIG. 3 illustrates these timing relationships, i.e. the coincidence of range clock pulses with trigger pulses. An example of the storage of a logical "one" following pulse "1" of the trigger waveform, a logical "zero" following pulse "2" of the trigger waveform, and a logical "one" following pulse "3" of the trigger waveform. All the signal data are from the first range element and at each trigger pulse the delay means 15 will be seen to contain data from each range element from the previous six pulse transmissions.

The output from delay means 15 provides one of the two inputs received by AND gate 17, the other input being the sweep clock pulses. Accordingly, the total number of logical "ones" (for each range element) which had been stored in the delay means 15 after the previous six radar pulses, develop commensurate output signals by reason of coincidence with the sweep clock pulses. Thus, the total number of "ones" as represented by the signal output of AND gate 17 are impressed upon the counter 18.

Counter 18, it will be noted, is reset by each range clock pulse and the accumulated count in counter 18 is compared in comparator 19 which may represent an established threshold as desired.

The output of the comparator 19 may be a logical "one," indicating and confirming the presence of signal information in the input data, while a logical "zero" indicates the absence of signal information in the input data.

In a typical operation, the logical "one" output of comparator 19, indicating that signal information is present, may be combined with range information derived from a range clock counter and bearing information obtained from an antenna bearing indicator, such as a shaft encoder for a typical radar system.

The manner in which such information as signal present, range, bearing, etc. is utilized, however, depends on the purpose of the radar used. However, in accordance with the concept of the present invention it will be noted that up to this point the operation of the moving-window detector and the detection of signal information is accomplished automatically.

Theoretical analysis

For purposes of analysis of the operation of a typical radar embodiment of the present invention, it may be assumed that the output signal of a radar receiver is a random variable $x$ with the continuous density function $f(x,\theta)$ where $\theta$ is an unknown parameter such that $\theta=\theta_n$ when only noise is present, and $\theta=\theta_s$ when both signal and noise are present. Thus, $\theta_s$ is related to the signal-to-noise ratio, i.e. specifying the signal-to-noise ratio is equivalent to specifying $\theta_s$. The variable $x$ is compared with a reference voltage Q and the variable $y$ is given the value "1" if $x \geq q$ and the value "0" otherwise.

In some instances "two-sided protection" might be desirable; that is, when a signal is present the output $x$ may tend to be either larger or smaller than when only noise is present. In that case, the variable $x$ is compared with two reference voltages $q_1$ and $q_2$ ($q_2 \leq q_1$) and the variable $y$ is given the value 0 if $q_1 \leq x \leq q_2$ and the value one otherwise.

The probability that $y=1$ when $\theta=\theta_s$ may be designated by $P_s$ and the probability that $\theta=\theta_n$ may be designated by $P_n$. Then $$P_s = \int_q^\infty f(x,\theta_s)\,dx \qquad (1)$$

$$P_n = \int_q^\infty f(x,\theta_n)\,dx \qquad (2)$$

It will further be assumed that observation on $x$, and hence observations on $y$, are independent. The moving-window detector of width $n$ operates as follows. At the $k$th observation ($k \geq n$).

$$W_{kn} = \sum_{i=k-n+1}^{k} Y_i \qquad (3)$$

is calculated and compared with a threshold which may be designated as T, and if $W_{kn}$ is $\geq T$ a signal may be claimed to be present. The width $n$ is determined by the antenna beam width, the radar pulse repetition frequency, and the antenna scan rate. That is, $n$ is the number of times a target, which is small with respect to the antenna beam width, is illuminated upon being scanned over by the antenna. A representative sequence of observations on $y$ when a target is present is $$\ldots Y_n, Y_n, Y_n, \overbrace{Y_s, Y_s \ldots Y_s}^{n}, Y_n, Y_n, Y_n, Y_n \ldots$$

where $y_n$ and $y_s$ are observations from noise-only and signal-plus-noise populations of input data, respectively. If it is further assumed that $y_i \epsilon y_s$ denotes the fact the $y_i$ is an observation from the signal-plus-noise population. When a target is present, $W_{kn}$ will for $2n-1$ consecutive values of $k$ be such that $y_i \epsilon y_s$ for at least one value of $i$, $k-n+1 \leq i \leq k$. That is, at least one signal observation will be integrated for $2n-1$ consecutive values of $k$.

The probability of the false alarm (i.e. wrongly concluding that a signal is present) will be denoted by $\alpha$ and the probability of detection (i.e. correctly claiming a signal present) will be designated by $p'_d$. It should be noted that a false alarm does not occur if $W_{kn} \geq T$ when $y_i \epsilon y_s$ of at least one value of $i$, $k-n+1 \leq i \leq k$. Then it follows that $$\alpha = \sum_{r=t}^{n} \binom{n}{r} P_n^r (1-P_n)^{n-r} \qquad (4)$$

As previously stated, when a target is present there are $2n-1$ consecutive values or $k$ such that $y_i \epsilon y_s$ for some $i$, $k-n+1 \leq i \leq k$. Hence, the probability of detection as given by $p'_d = \text{Prob }\{W_{kn} \geq T$ for at least one $k$ such that $y_i \epsilon y_s$ for some $i$, $k-n+ \leq i \leq k\}$. Because of the mutual dependence of the $W_{kn}$, $p'_d$ is difficult to calculate. Therefore, the approximation or lower bound $pp_d = \text{Prob}$ $\{W_{kn} \geq T$ for $k$ such the $y_i \epsilon y_s$ for all $i$, $k-n+1 \leq i \leq k\}$ will be used. That is to say, $p_d$ is the probability of claiming a signal is present when the window perfectly matches the signal data. It follows that $$p_d = \sum_{r=t}^{n} \binom{n}{r} P_s^r (1-P_s)^{n-r} \qquad (5)$$

when it is assumed that $P_s$ is constant throughout the observations for which $y_i \epsilon y_s$. This is, of course, not satisfied in the case of a scanning radar where $P_s$ is a function of the antenna pattern. Equation 5 should be a good approximation of the actual probability of detection, and, in cases where the relationship between $P_s$ and the antenna pattern is known, Equation 5 can be modified to give $p_d$ exactly.

As previously mentioned, the number of observations integrated is determined by the antenna pattern, the radar pulse repetition frequency, and the antenna scan rate. Also some value $\alpha_0$ is usually determined beforehand as the tolerable false alarm probability. This determination is based on such things as the cost of making a false alarm and the action taken when the false alarm is made. Supposing that $f(x,\theta_n)$ is known. Then, for the given value of $n$ and $\theta_0$ using Equations 2 and 4, there are $n$ pairs (T, $q$), $T=1, 2 \ldots, n$, such that $\alpha = \alpha_0$. It should be noted that $q=q(T)$.

Supposing further, that the design signal-to-noise ratio is chosen so as to specify $f(x, \theta_s)$. Then, using Equations 1 and 5, for each pair (T, $q$), $p_d$ is determined, and the pair (T, $q$) which maximized $p_d$ is used. This procedure maximizes $p_d$ for a particular signal-to-noise ratio but may degrade $p_d$ for some other signal-to-noise ratio. Hence, it might be wished to duplicate the above procedure for a range of expected signal-to-noise ratios and then select a pair (T, $q$) as representative thresholds to be employed.

If a computer is available, the computations necessary to maximize $P_d$ can be done easily provided the integrations indicated in Equations 1 and 2 can be performed. In some cases the normal approximation of the binomial can be used in order to avoid having to solve Equations 4 and 5, but the normal approximation can be very inaccurate when applied to Equation 4 since $\alpha_0$ is usually small and T is restricted to integral values.

Other approaches to the selection of T and $q$ may be employed such as that suggested and discussed by J. V. Harrington in a publication titled An Analysis Of The Detection Of Repeated Signals In Noise By Binary Integration, published in the IRE Transactions on Information Theory, vol. IT-1, pages 1-9, March 1955.

The previous discussion can be extended immediately to cover the case where multiple-range-element data are to be processed by binary integration. Supposing that there are $w$ range elements, with data from each element obtained by observing the receiver output at fixed times relative to the radar pulse transmission, the receive rout-put is a vector $X_k = (x_{1k} \ldots x_{wk})$, where $x_{jk}$ is the output from the $j$th range element after the $k$th pulse. The corresponding vector $Y_k = (y_{1k} \ldots y_{wk})$ is formed where $y_{jk}=1$ if $x_{jk} \leq q$ and $y_{jk}=0$ otherwise. After the $k$th pulse the $w$ sums $$W_{kn}^{(j)} = \sum_{i=k-n+1}^{k} Y_{ji}$$

$j=1, 2 \ldots, w$ \hspace{2cm} (6)

are calculated and compared with threshold T and a signal is claimed present in each range element for which $W_{kn}^{(j)} \geq T$.

A preferred embodiment of the present invention as schematically represented and illustrated in FIG. 1 defines a combination of equipment which will calculate $W_{kn}^{(j)}$ in the manner of operation previously described. It will be recalled that as a result of its operation the counter 18 counts the total number of "one's" (for each range element) which had been stored in the delay means 15 after the previous six radar pulses. That is to say, that the counter 18 computes $$W_{k6}^{(j)} = \sum_{i=k-5}^{k} Y_{ji}$$

$j=1, 2 \ldots, 1300$ \hspace{2cm} (7)

where $y_{ji}$ is the binary datum from the $j$th range element after the $i$th pulse. The contents of the counter 18 are compared in the comparator 19 with the preset threshold T. The output from comparator 19 accordingly is "1" if $W_{k6}^{(j)} \geq T$, and is "0" otherwise. If the output from the comparator 19 is 1, a signal is claimed to be present in the corresponding range element.

In the system thus far described in connection with the explanation of the operation of the embodiment illustrated in FIG. 1, the received input data were transformed into 1-bit binary numbers. This type of binary quantization results in a loss of approximately 2 db in signal-to-noise ratio. Most of this loss can be avoided by using more than 1-bit accuracy in representing the observations. Fortunately, the concept and teaching of the present invention is especially readily adaptable to employment with multiple bit binary manipulation.

Figure 4:
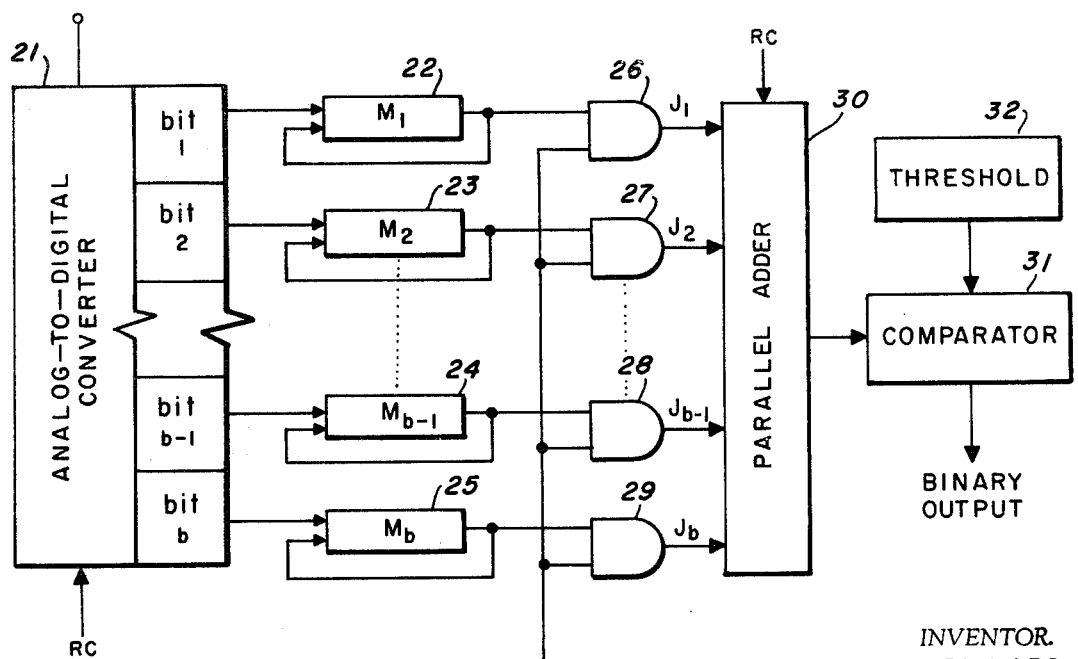
FIG. 4 is a schematic block diagram of a moving window detector embodiment of the present invention for processing and detecting a signal information in multiple bit binary data.

As is shown in FIG. 4, instead of a quantizer as was employed in the embodiment illustrated in FIG. 1, an analog-to-digital converter 21 is utilized to transform the input data realized from a radar receiver output into $b$-bit binary numbers. Each of the $b$ bits is stored in one of $b$ delay means such as those illustrated at 22, 23, 24, and 25 in much the same manner as previously described in connection with the one bit system. The multiplicity of delay means 22, 23, 24, and 25 are recirculating in the same manner as in the one bit system of FIG. 1.

The outputs from all the delay means 22, 23, 24, and 25 are considered as a $b$-bit binary number and are added by means of the AND gates 26, 27, 28, and 29 into a parallel adder 30 which also receives the range clock pulse for resetting in the manner of the counter 18 employed in the illustration of the embodiment of FIG. 1. The output of parallel adder 30 is treated in the same manner previously described, being connected as an input to a comparator 31 which compares the multiple bit binary number with a threshold binary number received from the threshold source 32. A resultant binary output is produced by comparator 31 in accordance with whether the input received from the parallel adder 30 exceeds or is less than the established binary threshold generated by the threshold source 32.

Accordingly, it will be readily appreciated by those skilled in the art that the invention of the present system lends itself to a higher degree of accuracy as may be obtained through the use of multiple bit binary techniques as well as the single bit binary criteria which is restricted to a "one" or "zero" determination.

It can be seen from an understanding of the present invention that several most important advantages reside in its concept and teaching. For example, in many detectors of prior art type, each range element would require an associated counter means which necessarily complicated and compounded the amount of equipment required for proper functioning. However, in accordance with the concept of the present invention each range element is sequentially sampled so that the same delay means, recirculating path, and counter may be employed for all range elements.

Moreover, as previously described and explained in connection with the system illustrated in FIG. 4, the present invention lends itself readily to a multiple bit binary number technique further enhancing the desirability and the accuracy of the system.

Obviously many modifications and variations of the present invention are possible in the light of the above teachings. It is therefore to be understood that within the scope of the appended claims the invention may be practiced otherwise than as specifically described.

What is claimed is:

1. A system for detecting signal information in input data relative to cyclic time references comprising:
   first means for cyclically sampling said input data at incremental first time periods relative to said time reference, said means being operative to produce an output signal indicative of the presence of signal information in said input data;
   second means for cyclically sampling the output of said first means at second incremental time periods occurring an integral number of times during each said first time period;
   delay means arranged to receive the output signal of said second means and including a path to recirculate said output signal to the input of said second means, said delay means having a delay period equal to the sum of the time period between said cyclic time references and a determinable number of said second incremental time periods;
   means for sampling the output of said delay means at said second incremental time periods;
   means for counting the sampled outputs of said delay means for producing signals representative of a cumulative count;
   comparator means connected to receive said cumulative count for producing an output when said cumulative count exceeds a determinable reference count signal, whereby to confirm the presence of signal information in said input data.

2. A system for detecting signal information as claimed in claim 1 and including means in said path to recirculate and operatively responsive only to the coincidence of a delayed signal and the absence of a sampling signal at said incremental first time period for permitting recirculation of said delayed signal.

3. A system for detecting signal information as claimed in claim 1 wherein said delay means has a delay period equal to the sum of the time period between said cyclic time references and one of said second incremental time periods.

4. A system for detecting signal information as claimed in claim 1 and including means connected to its input terminals for binarily quantizing said input data.

5. A system for detecting signal information as claimed in claim 4 wherein said comparator means produces a binary output signal for confirming the presence of signal information.

6. A system for detecting signal information as claimed in claim 1 and including an analog-to-digital converter connected to receive said input data for producing discrete $b$-bit binary outputs and a delay means arranged and connected for processing each said discrete bit binary output.

7. A system for detecting signal information as claimed in claim 6 and including a parallel adder connected to receive the outputs of said delay means for producing a single binary output connected to the input terminal of said comparator.

8. A system for detecting signal information as claimed in claim 1 wherein said input data comprises the output of a radar receiver.

9. A system for detecting signal information as claimed in claim 8 wherein said first time period is representative of range and said second time period is representative of angular disposition.

10. A system for detecting signal information as claimed in claim 8 wherein the output of said comparator resolves angular disposition.

References Cited

UNITED STATES PATENTS

| | | | |
|---|---|---|---|
| 2,914,757 | 11/1959 | Millership et al. | 340—347 |
| 3,235,867 | 2/1966 | Wirth | 343—16 |

MAYNARD R. WILBUR, Primary Examiner

M. K. WOLENSKY, Assistant Examiner

U.S. Cl. X.R.

340—347; 343—5